United States Patent [19]

Nally et al.

[11] Patent Number: 5,506,604
[45] Date of Patent: Apr. 9, 1996

[54] APPARATUS, SYSTEMS AND METHODS FOR PROCESSING VIDEO DATA IN CONJUNCTION WITH A MULTI-FORMAT FRAME BUFFER

[75] Inventors: Robert M. Nally, Plano; John C. Schafer, Wylie; Jeffrey A. Niehaus, Dallas, all of Tex.

[73] Assignee: Cirrus Logic, Inc., Fremont, Calif.

[21] Appl. No.: 223,845

[22] Filed: Apr. 6, 1994

[51] Int. Cl.⁶ ..................................................... G09G 5/04
[52] U.S. Cl. .......................................... 345/154; 345/153
[58] Field of Search .................................... 345/154, 115, 345/116, 153, 133, 189, 200, 202, 203; 382/56; 358/427

[56] References Cited

U.S. PATENT DOCUMENTS 4,991,122  2/1991  Sanders ..................................... 345/153
5,218,432  6/1993  Wakeland .
5,274,753  12/1993  Roskowski et al. ..................... 345/116
5,341,318  8/1994  Balkanski et al. ....................... 358/427
5,341,442  8/1994  Barrett .
5,365,278  11/1994  Willis ..................................... 348/581

Primary Examiner—Richard Hjerpe
Assistant Examiner—Regina Liang
Attorney, Agent, or Firm—Fulbright & Jaworski

[57] ABSTRACT

A processing system 100 is provided which includes a memory 107 and memory control circuitry 203. Packing circuitry 215 is operable to receive a stream of video data words in a first YUV format and convert those video data words into a plurality of packed words in a second YUV format. Memory control circuitry 203 is operable to simultaneously store the plurality of packed YUV words in memory 107 in the second format along with a plurality of RGB words.

16 Claims, 2 Drawing Sheets

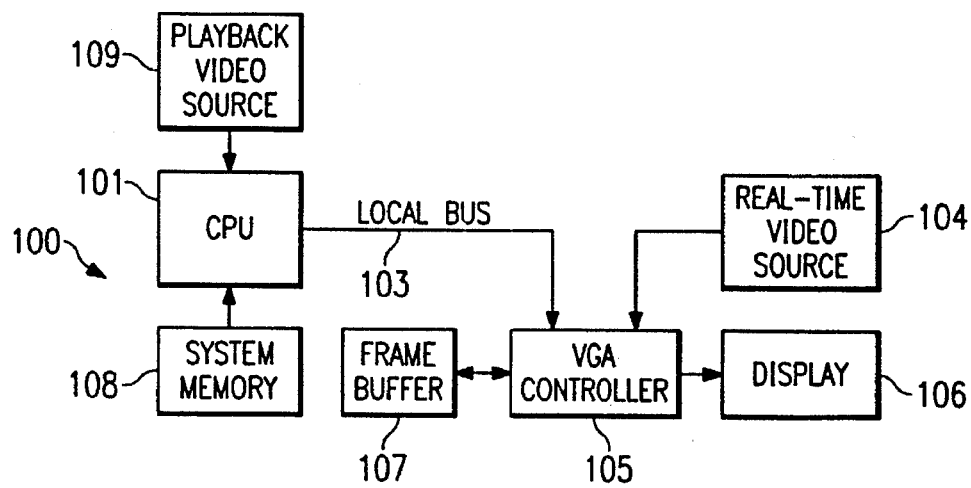
FIG. 1
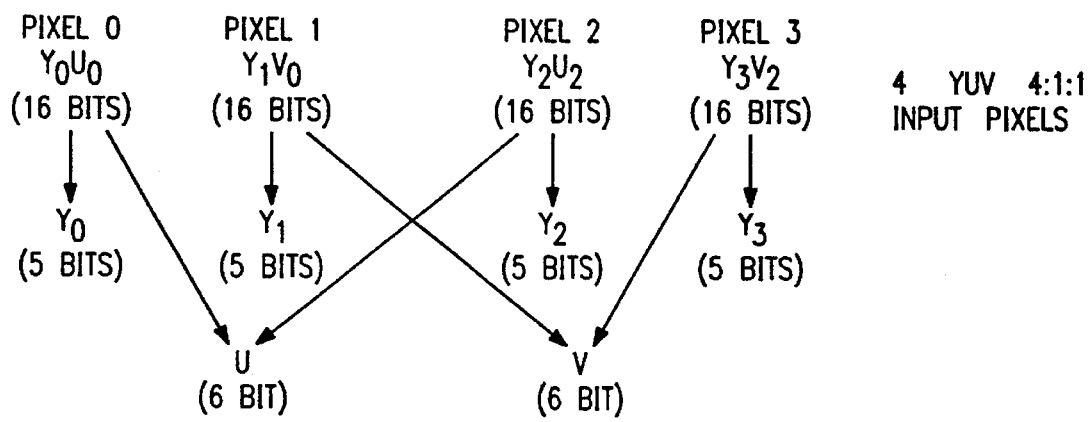
FIG. 3
| U | V | $Y_0$ | $Y_1$ | $Y_2$ | $Y_3$ |
| D<31:26> | D<25:20> | D<19:15> | D<14:10> | D<9:5> | D<4:0> |
FIG. 4

APPARATUS, SYSTEMS AND METHODS FOR PROCESSING VIDEO DATA IN CONJUNCTION WITH A MULTI-FORMAT FRAME BUFFER

TECHNICAL FIELD OF THE INVENTION

The present invention relates in general to video data processing and in particular to apparatus, systems, and methods for processing video data in conjunction with a multi-format frame buffer.

BACKGROUND OF THE INVENTION

As multimedia information processing systems increase in popularity, system designers must consider new techniques for controlling the processing and display of data simultaneously generated by multiple sources. In particular, there has been substantial demand for processing systems which have the capability of concurrently displaying both video and graphics data on a single display screen. The development of such systems presents a number of design challenges, not only because the format differences between graphics and video data must be accounted for, but also because of end user driven requirements that these systems allow for flexible manipulation of the data on the display screen.

One particular technique for simultaneously displaying video and graphics data on a single display screen involves the generation of "windows." In this case, a stream of data from a selected source is used to generate a display within a particular region or "window" of the display screen to the exclusion of any non-selected data streams defining a display or part of a display corresponding to the same region of the screen. The selected data stream generating the display window "overlays" or "occludes" the data from the non-selected data streams which lie "behind" the displayed data. In one instance, the overall content and appearance of the display screen is defined by graphics data and one or more "video windows" generated by data from a video source occlude a corresponding region of that graphics data. In other instances, a video display or window may be occluded or overlaid by graphics data or even another video window.

In the multimedia environment, the "windowing" described above yields substantial advantages. Among other things, the user can typically change the size and location on the display screen of a given window to flexibly manipulate the content and appearance of the data being displayed. For example, in the case of combined graphics and video, the user can advantageously create custom composite visual displays by combining multiple video and graphics data streams in windowing environment.

In order to efficiently control windows in a multimedia environment efficient frame buffer management is required. Specifically, a frame buffer control scheme must be developed which allows for the efficient storage and retrieval of multiple types of data, such as video data and graphics data. To be cost competitive as well as functionally efficient, such a scheme should minimize the number of memory devices and the amount of control circuitry required and should insure that data flow to the display is subjected to minimal delay notwithstanding data type.

Presently available systems disadvantageously employ two buffers, one for storing video data and one for storing graphics data. Such systems waste memory space and increase the number of memory devices required. Further, in order to handle dual frame buffers, more memory control circuitry is required which complicates both system structure and operation. Among other things, the need to access two frame buffers substantially impacts system operating speed. Additionally, the increased amount of control circuitry adds further unnecessary costs above and beyond the increase costs caused by inefficient memory use.

Thus, due to the advantages of windowing, the need has arisen for efficient and cost effective windowing control circuitry. Such windowing circuitry should allow for the simultaneous processing of data received from multiple sources and in multiple formats. In particular, such windowing control circuitry should be capable of efficiently and inexpensively controlling the occlusion and/or overlay of video and graphics data in a windowing environment. Preferably, such systems should employ a single frame buffer for storing both video and graphics data simultaneously.

SUMMARY OF THE INVENTION

According to the principles of the present invention, a processing system is provided which includes a frame buffer, packing circuitry, and memory control circuitry. The frame buffer is operable to simultaneously store data in at least two different formats. The packing circuitry is operable to receive a stream of video data words in a first YUV format and convert the video data words into a plurality of packed words in a second YUV format. The memory control circuitry is operable to store the plurality of packed YUV words in the memory in the second format.

According to a second embodiment constructed in accordance with the principles of the present invention, a processing system is provided which includes a frame buffer and circuitry for receiving a plurality of pixel words in a YUV format. The frame buffer may also be configured to simultaneously store graphics data independently from the YUV (video) pixel data. Each of the plurality of YUV pixel words includes a Y-component of a selected number of bits; a first set of the plurality of words also includes a U-component of a selected number of bits and a second set of the plurality of pixel words also includes a V-component of a selected number of bits. Circuitry is provided for reducing the number of bits in the Y-component of each of the plurality of words to obtain a plurality of reduced Y-components. Circuitry is also provided for averaging the values of the U-components of the first set of pixel words to obtain an average U-component while additional circuitry is provided for averaging the values of the V-components of the second set of pixel words to obtain an average V-component. Circuitry is also provided for reducing the number of bits composing the average U-component and the average V-component. Circuitry for packing packs the reduced Y-components and the reduced average U-component and the reduced average V-component into a packed word. Circuitry for storing then stores the packed word in the frame buffer.

The principles of the present invention are also embodied in a display system which includes a central processing unit, a frame buffer, first and second video pipelines, memory control circuitry interfacing the first and second video pipelines with the frame buffer, and display circuitry. The first video pipeline is operable to pack a stream of video data words received from the central processing unit in a 4:2:2 YUV format and convert such video data words into a plurality of packed words in a 4:1:1 YUV format. The memory control circuitry is operable to store the plurality of packed 4:1:1 YUV words in the frame buffer. The second video pipeline in conjunction with the memory control circuitry retrieves the plurality of packed words in the 4:1:1 YUV format from the frame buffer and reconverts such data back into 4:2:2 format YUV data. The display circuitry displays an image defined by the 4:2:2 YUV data output retrieved and converted by the second video pipeline.

Methods are also provided embodying the principles of the present invention. A first method is provided for operating a frame buffer which includes the step of receiving a plurality of pixel words in a YUV format, each of the plurality of pixel words including a Y-component of a selected number of bits; a first set of the plurality of pixel words including a U-component of a selected number of bits and a second set of the plurality of words including a V-component of a selected number of bits. The number of bits in the Y-component of each of the plurality of words are reduced to obtain a plurality of reduced Y-components. The values of the U-components of the first set of words are averaged to obtain an average U-component, while the values of the V-components of the second set of words are averaged to obtain an average V-component. The number of bits composing the number of average U-component and the average V-components are then reduced. The reduced Y-components and the reduced average U-component and reduced average V-component are packed into a single word which is stored in the frame buffer.

A second method is also provided for processing video data according to principles of the present invention. A stream of video data is received in a 4:2:2 YUV format. The stream of video data is then converted into a plurality of packed words in a 4:1:1 YUV format and then stored in a frame buffer in such 4:1:1 YUV format.

A third method is provided in which both video and graphics data are simultaneously stored in a single frame buffer. At least the video data is converted from a first YUV format into a second YUV format before storage in the frame buffer. The video data and graphics data can then be independently retrieved and processed according to format.

Apparatus, systems, and methods embodying the principles of the present invention have substantial advantages over prior art video processing systems. The principles of the present invention allow video data to be efficiently stored within an available space within a frame buffer or other memory. In particular, the efficient packing according to the principles of the present invention allows the implementation of a multi-format frame buffer in which both graphics data, from a graphics processor or central processing unit, and video data, either in real time or in non-real time, can be efficiently stored within the same memory space.

BRIEF DESCRIPTION OF THE DRAWINGS

FIG. 1 is a functional diagram of a data processing system embodying the principles of the present invention;

FIG. 3 is a diagrammatical representation of data conversion and packing as performed by the illustrated embodiment of the VGA controller of FIG. 2; and FIG. 4 is a diagrammatical representation of a packed data word resulting from the data conversion and packing operation depicted in FIG. 3.

DESCRIPTION OF THE INVENTION

Figure 2:
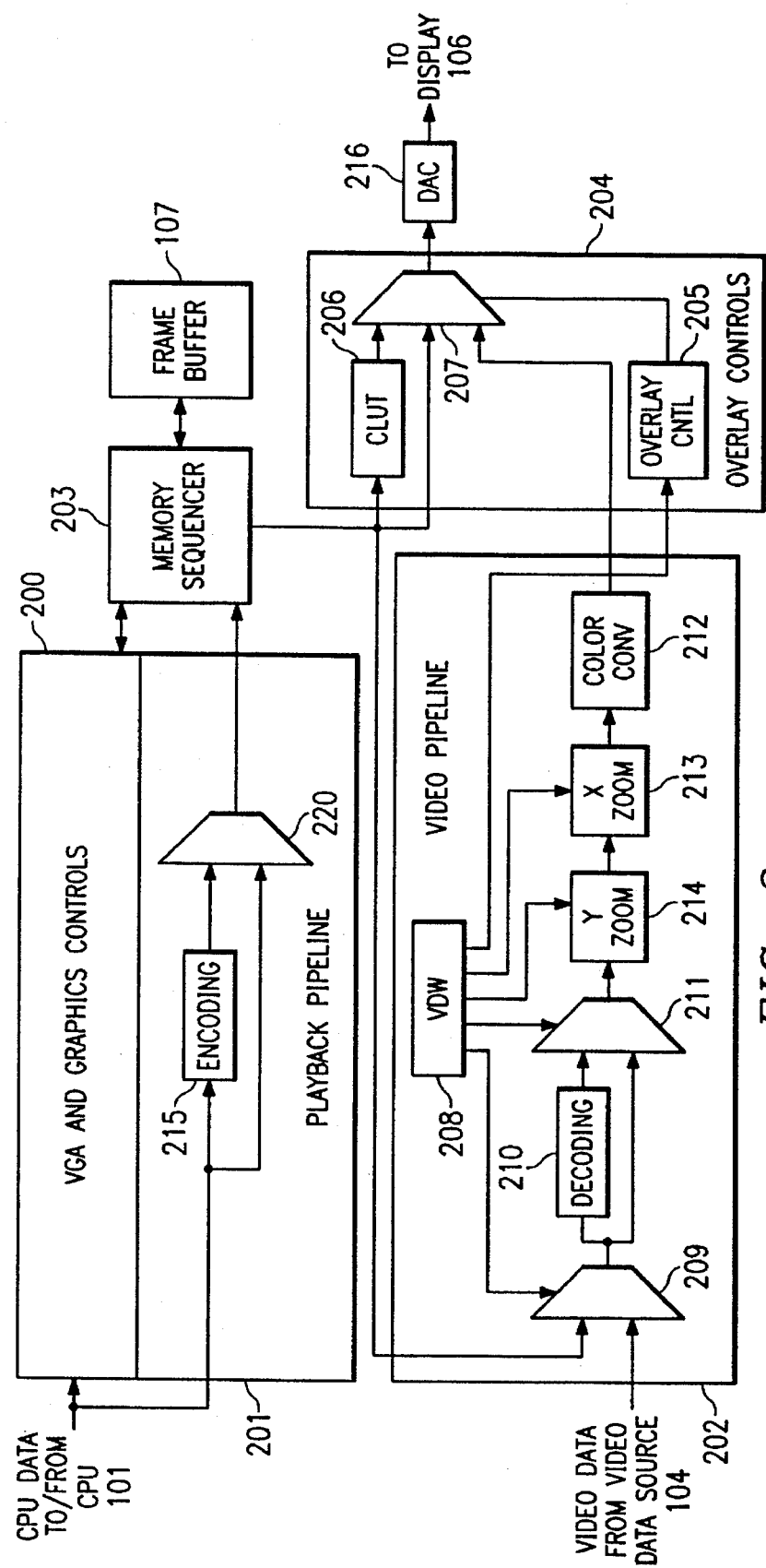
FIG. 2 is a more detailed functional block diagram of the VGA controller depicted in FIG. 1.

FIG. 1 is a high level functional block diagram of a display system 100 operable to simultaneously display both graphics and video data according to the principles of the present invention. Display system 100 includes a central processing unit (CPU) 101 which controls the overall operation of system 100 and generates graphics data defining graphics images to be displayed by system 100. A playback video source 109 is coupled to CPU 101. Playback video source 109 may be for example either a hardware device or software which provides data at any frame rate or resolution allowing CPU 101 to generate video (YUV) data. Playback source 109 may be for example a motion pictures expert group (MPEG) decoder or an INDEO software playback decompressor. CPU 101 communicates with the remainder of system 100 discussed below via a local bus 103. System 100 also includes a real-time video source 104 which provides digitized video data to be processed and displayed by system 100. Real-time video source 104 may be, for example, a videotape unit, television cable outlet, laser disk, CD ROM, MPEG decoder or video data source outputting real-time video data in a YUV format at a typical rate of 30 frames per second and in typical NTSC resolutions of 640×480 pixels. System 100 further includes system memory 108 which stores graphics and video data on a non-real-time basis. System memory may be for example a CD ROM, floppy disk, DRAM, or other type of mass data storage device.

A VGA controller 105 embodying the principles of the present invention is coupled to local bus 103. VGA controller 105 will be discussed in detail below; however, VGA controller 105 generally provides an interfaces CPU 101 and/or video source 104 with the system frame buffer 107 and display unit 106. Frame buffer 107 provides temporary storage of the graphics and video data during processing prior to display on display unit 106. According to the principles of the present invention, VGA controller 105 is operable to store graphics and video data together in a multi-format frame buffer 107 in their native formats. In a preferred embodiment, the frame buffer area is partitioned into video memory which generally includes the areas of the frame buffer used for storing YUV formatted data and graphics memory which generally includes the areas of the frame buffer used for storing RGB formatted data. In the preferred embodiment, display unit 106 is a conventional raster scan display device and frame buffer 107 is constructed from dynamic random access memory devices (DRAMs).

It should be noted that at least any video data being processed may be stored in frame buffer 107 in one of two ways. When "in place" video storage is used, the data for a "video window" is located in memory vis-a-vis the graphics data as the video and graphics data will appear on the display screen. When "offscreen video" storage is used, the data for a given video window is stored in an area of memory which would be "unviewable" if data is retrieved only from the memory areas directly corresponding to the display screen. In other words, unless a separate area of memory holding the video data is accessed, the graphics data for the underlying portion of the graphics window is accessed and used in the generation of the display screen.

FIG. 2 is a detailed functional block diagram emphasizing VGA controller 105. The primary components of VGA controller 105 include a conventional VGA/graphics controller 200, a video playback pipeline 201 and a video pipeline 202. VGA/graphics controller 200 receives graphics data from CPU 101 via bus 103, and in conjunction with frame buffer 107 performs additional processing, for example color expansion, on that data prior to delivery to the overlay controller 204 and display 106. Video playback pipeline 201 receives stored (non-real-time) video data from CPU 101 and system memory 108 in a YUV format, and as discussed in detail below, packs that data into frame buffer 107. Video pipeline 202 receives either real-time data from real-time video source 104 or video data packed into frame buffer 107 by video playback pipeline 201. Video pipeline 202 among other things, determines when the received video data is to be overlaid as a window on the display screen of display 106, converts the received YUV data (from either frame buffers 107 or video source 104) into an RGB data format compatible with display 106 and performs X-zooming. In the case of video data retrieved from frame buffer 107, video pipeline also "unpacks" the retrieved data, as will be discussed further below.

A memory sequencer 203 controls and arbitrates accesses to and from frame buffer 107. Graphics data (which in the preferred embodiment is in an RGB format) retrieved from frame buffer 107 through memory sequencer 203 is passed to the digital to analog converter 216 during display 106 through overlay controls 204. The graphics data stream can be used to either address a color look-up table 206, the output of which is provided to the first input of an overlay selector 207, or can be passed directly to a second input of overlay selector 207 as true color data. The third input of overlay selector 207 is used to receive video data output from video pipeline 202. The inputs of overlay selector 207 are selected in response to control signals generated by overlay control circuitry 205 in response to the control signals provided by video window controls 208 in video pipeline 208. The output of overlay selector 207 are provided to digital to analog converter (DAC) 216 with drives display 106.

Video pipeline 202 generally includes video window controls (VDW) 208 which control the transfer of video data from frame buffer 107 to video pipeline 202 and the transfer of video data to display 106 (via DAC 216) through the overlay selector 207. In the preferred embodiment, video window controls 208 is constructed as a series of registers, counters and address generators loaded and controlled by CPU 101. A selector 209 controls whether, depending on the operating mode, data from frame buffer 107 or real-time video data received directly from video source 107 is to be processed. Recoding (packing) circuitry 210, which will be discussed in further detail below, in the preferred embodiment unpacks the video data retrieved from frame buffer 107. In alternate embodiments, decoding circuitry 210 may also be used to decode (unpack) packed video data received directly from video source 104. A second selector 211 selects between data output from selector 209 and data output from decoding circuitry 210, depending on whether unpacking is required. Color converter 212 converts the video data from the native YUV format to an RGB format compatible with DAC 216. An x-zoomer 213 is provided to expand RGB pixel data on a pixel-by-pixel basis along a given display row. Y-zoomer 214 is provided to perform a y-zoom to expand the incoming video data on a display line basis.

In the illustrated embodiment, when 8-bit graphics pixels are being processed by VGA/graphics controller 200, any video playback data is passed to video playback pipeline 201 from CPU 101 as 16-bit words in a YUV 4:2:2 format. Encoding (packing) circuitry 215 then converts and packs the YUV 4:2:2 data as 32-bit words of YUV 4:1:1 data in frame buffer 107. A selector 220 is provided for bypassing encoding circuitry 215 when data packing is not desired or not required. In the preferred embodiment, the packed video data is stored in frame buffer 107 in a raster oriented format with four pixels in a raster (display) line packed into each 32-bit word. During the refresh of the screen of display 107, the 32-bit words are retrieved from frame buffer 107 by video window controls 208 and then unpacked by decoding circuitry 210.

FIG. 3 is a diagrammatical representation showing the converting and encoding of four adjacent incoming YUV 4:2:2 pixels for a given display line into a single 32-bit word by encoding circuitry 215. In the 4:2:2 YUV format, each of the four 16-bit input pixels (Pixel 0–Pixel 3) contains a corresponding 8-bit Y component ($Y_0$–$Y_3$). Pixels 0 and 2 each contain a 8-bit U component (components $U_0$ and $U_2$ respectively) while Pixels 1 and 3 contain an 8-bit V component (components $V_0$ and $V_2$ respectively). During the conversion and packing operation, packing circuitry 215, through truncation of the least significant bits and error diffusion, reduces the number of bits composing each Y component $Y_0$–$Y_3$ from 8 bits to 5 bits. In the error diffusion process, the fractional error resulting from each truncation from 8 bits to 5 bits is accumulated until the sum totals 1.0 or more, at which time 1 is added in the stream after truncation. Encoding circuitry 215 further takes the averages of the values 8-bit U components $U_0$ and $U_2$ and the values of the 8-bit V components $V_0$ and $V_2$ and then, by truncation of least the significant bits and error diffusion, reduces the average U and V components from 8 bits to 6 bits. After truncation, an error diffusion is performed on the average U and V, as was done with Y-components. The resulting four reduced 5-bit Y components ($Y_0$–$Y_3$) and the 6-bit U and V components are then packed into a 32-bit word for storage in frame buffer 107. It should be noted that other techniques of packing data by encoding circuitry 210 may be employed in alternate embodiments to accommodate such factors as circuit/system costs. For example, in less sophisticated, less expensive ("low end") systems, encoding circuitry 210 may simply perform a truncation to reduce the number of bits of each component. A packing scheme used in the preferred embodiment is depicted in FIG. 4.

When the non-real-time video data is being displayed, the 32-bit packed words are retrieved during the refresh of the screen of display 106 from frame buffer 107 by video window controls 208 and then "unpacked" before being passed down the remainder of video pipeline 202. Decoding circuitry 210 performs this unpacking function by dithering the Y components $Y_0$–$Y_4$ back to 8 bits by shifting the existing five bits into the most significant bit positions and adding a 3-bit randomly generated number to the component as the new least significant bits. In the case of the U and V components, zeros are added as least significant bits to expand each component from 6 bits back to 8 bits. The 8 bit U and V components are then simply replicated to obtain new 8-bit $V_0$ and $V_1$ and $V_0$ and $V_1$ components. The unpacked 4:2:2 YUV video is then passed to color converter 212 for conversion into RGB true color data and x-zoomer 213 and y-zoomer 214. As in the case of encoding circuitry 215, alternate embodiments of decoding circuitry 210 may be used depending on the desired cost and sophistication. For example, in "low end" embodiments, decoding circuitry may reconstruct removed bits of the Y components by simply padding LSBs with zeros.

Although the present invention and its advantages have been described in detail, it should be understood that various changes, substitutions and alterations an be made herein without departing from the spirit and scope of the invention as defined by the appended claims.

What is claimed is:

1. A processing system comprising:

a memory;

packing circuitry operable to receive a stream of video data words in a first YUV format and convert said video data words into a plurality of packed words in a second YUV format, said packing circuitry:

receiving four selected said video data words of said stream in a 4:2:2 YUV format;

reducing a number of bits of a Y component of each of said selected words to obtain four corresponding reduced Y components;

averaging a value of a U component of a first one of said words with a value of a U component of a third one of said selected words to obtain an average U value;

averaging a value of a V component of a second one of said selected words with a value of a V component of a fourth one of said words to obtain and average V value;

reducing the number of bits composing said average U and V components; and packing said reduced Y-components, said reduced average U component and said reduced average V component into a single 4:1:1 word; and memory control circuitry operable to simultaneously store said plurality of packed YUV words in said memory in said second format along with a plurality of graphics data words in an RGB format.

2. The processing system of claim 1 wherein said memory comprises a frame buffer.

3. The processing system of claim 2 wherein said frame buffer comprises a multi-format frame buffer operable to simultaneously store both graphics and video data.

4. The processing system of claim 1 and further comprising:

circuitry operable to retrieve said packed words in said second YUV format from said frame memory; and unpacking circuitry operable to reconvert said packed words in said second YUV format into YUV data in said first format.

5. The processing circuitry of claim 4 wherein said first YUV format is a 4:2:2 format and said second format is a 4:1:1 format.

6. The processing system of claim 4 wherein said unpacking circuitry is operable to:

dither least significant bits of said Y-components of each retrieved said packed word;

replicate each of said U-component and V-components of each retrieved said packed word; and dither least significant bits of said replicated U-components and V-components.

7. The processing system of claim 1 wherein each of said four selected words comprises sixteen bits and wherein said packing circuitry:

reduce eight bits of said Y component of each of said selected words to obtain reduced Y components of five bits each using truncation and error diffusion;

average eight bits of a U component of said first one of said words with eight bits of a U component of said third one of said selected words to obtain an eight bit average U value;

average eight bits of a V component of said second one of said selected words with eight bits of a V component of a fourth one of said words to obtain an eight bit average V value;

reduce the number of bits composing said average U and V components using truncation and diffusion; and pack said reduced Y-components, said reduced average U component and said reduced average V component into a thirty-two bit word in said 4:1:1 format.

8. A display system comprising:

a frame buffer;

memory control circuitry;

a first video pipeline operable to:

receive four selected video data words of a stream of video data in a 4:2:2 YUV format;

reduce a number of bits of a Y component of each of said selected words to obtain four corresponding reduced Y components;

average a value of a U component of a first one of said words with a value of a U component of a third one of said selected words to obtain an average U value;

average a value of a V component of a second one of said selected words with a value of a V component of a fourth one of said words to obtain and average V value;

reduce the number of bits composing said average U and V components; and pack said reduced Y-components, said reduced average U component and said reduced average V component into a single 4:1:1 word; and in association with said memory control circuitry, store said packed 4:1:1 YUV word in said frame buffer; and a second video pipeline operable to:

in association with said memory control circuitry, retrieve said packed word of 4:1:1 YUV data from said frame buffer; and reconvert said packed word of 4:1:1 YUV data into 4:2:2 YUV data.

9. The display system of claim 8 wherein said second video pipeline includes color conversion circuitry operable to convert said 4:2:2 YUV data into RGB data.

10. The display system of claim 8 wherein said second video pipeline includes a x-zoomer.

11. The display system of claim 8 wherein said second video pipeline includes a Y-zoomer.

12. The display system of claim 8 and further comprising graphics processing circuitry operable to process graphics data received from said CPU.

13. The display system of claim 12 wherein said frame buffer comprises a multi-format frame buffer operable to simultaneously store video data received from said first video pipeline and graphics data received from said graphics processing circuitry.

14. A method of processing video data comprising the steps of:

receiving a stream of video data in a 4:2:2 YUV format;

converting the stream of video data into a plurality of packed words in a 4:1:1 YUV format; and storing the plurality of 4:1:1 YUV packed words in a frame buffer reducing the number of bits of a Y-component of each word of the 4:2:2 YUV data stream to obtain a plurality of reduced Y-components;

averaging the values of U-components of first ones of the words of the data stream to obtain average U-components;

averaging the values of V-components of second ones of the words of the data stream to obtain average V-components;

reducing the number of bits composing the average U-components and the average V-components; and packing the reduced Y-components and the reduced average U-components and average V-components into a plurality of packed words in a 4:1:1 YUV format.

16. The method of claim 14 and further comprising the steps of:

retrieving the 4:1:1 YUV words from the frame buffer;

reconverting the from the 4:1:1 YUV format to a 4:2:2 YUV format.

16. The method of claim 15 wherein said step of reconverting comprises the substeps of:

padding least significant bits of the Y-components of each retrieved word;

replicating each of the U-component and V-components of each retrieved word; and padding the least significant bits of the U-components and V-components of each retrieved word.

* * * * *